May 7, 1968     I. J. HUTKIN     3,381,703

SELF-ADJUSTING VALVE SEAT

Filed April 7, 1965

IRVING J. HUTKIN
INVENTOR.

BY *Lyon & Lyon*

ATTORNEYS

United States Patent Office 3,381,703
Patented May 7, 1968

3,381,703
SELF-ADJUSTING VALVE SEAT
Irving J. Hutkin, San Diego, Calif., assignor to Whittaker Corporation, Los Angeles, Calif., a corporation of California
Filed Apr. 7, 1965, Ser. No. 446,246
17 Claims. (Cl. 137—341)

ABSTRACT OF THE DISCLOSURE

This patent describes a self-adjusting valve comprising a valve seat member, and receivable therein and in precise conformity therewith, a valve member, both members being electrically conductive, and at least one of said members being infiltrated by a metallic material having a melting point below that of either of said members; and an electrical circuit comprising the self-adjusting valve and an electrical power source.

---

The present invention relates to valve structures fabricated from inorganic materials which are capable of overcoming irregularities on the surface of the mating members to create a precise fit between these members. More particularly, the present invention relates to valve structures which are provided with means which permit the contour of at least one of the mating members to be modified so as to precisely conform to the surface against which it abuts.

The leak-proof valve seats of the prior art have been based on a number of different approaches. For ambient temperature applications the valve sealing components, that is the valve and seat, were fabricated from hard materials, such as tungsten carbide. The valve components from these materials are ground to extremely precise dimensions and finishes. The success of the final step in the polishing of the mating component surfaces is generally dependent upon the skill of the individual operator. Where valve-operating temperatures were low enough, the valve design often incorporated soft organic components to better conform to irregularities on the mating surfaces. However, when the fluid media is of a small molecular size, such as hydrogen, diffusion through the organic components readily occurs. Therefore, where diffusion is the problem the only alternative is to rely upon metal-to-metal junctions to effect the desired seal.

The reliance upon metal-to-metal junctions, has many drawbacks. The most important of these is the occurrence of junction degradation. The initial conformity between the two mating metal surfaces in a valve can be expected to decrease continuously because of normal operating wear resulting from abrasion, oxidation, impact and mechanical deformation. These wear effects are cumulative and over the operating life of a valve involving a million cycles, they can seriously impair the valve seat conformity.

Accordingly, it is an object of this invention to provide a novel self-sealing valve.

Another object of this invention is to provide for a valve seal conformity that can be re-established regardless of the extent of prior operation.

Yet another object of this invention is to eliminate the need for high-polishing or lapping of the mating components of the valve.

A further object of this invention is to eliminate the dependency of the valve seat quality upon the skill of individual operators.

These and other objects of this invention will be apparent to those skilled in the art from the detailed description which follows:

The self-adjusting valve seat of this invention utilizes the heat-generating mechanism occurring in the electrical contact switches together with a combination of materials that precludes sticking of the mating components. In this manner, heat is generated locally at the valve seat interfaces, in areas of existing high spots or irregularities, to effect melting of these areas and conformity between mating surfaces. The heat is generated by passing an electric charge through the seat components and is proportional to the electrical resistance of the seat junction. Thus, when there is good conformity between mating seat surfaces, the electrical contact resistance will be low and a smaller quantity of the heat generated will be dissipated over a larger area. When high spots or surface irregularities are present at the sealing interface, the contact resistance and heat generated will be high and will be dissipated through the surface irregularities until they melt to effect better conformity.

Briefly, the valve arrangement of this invention comprises a valve seat and a valve receivable in the seat. The valve and the seat must both be made of electrically conductive materials, and either or both of the mating members (the valve or the seat) are made of an electrically conductive porous material infiltrated with a metallic infiltrant which has a melting point below that of the porous material or any other material used to form the mating members.

This invention also comprehends any electrical circuiting containing the above described mating members, which is adapted to provide the energy necessary to melt the infiltrant at the mating surface.

The self-adjusting valve of the present invention may be better understood by reference to the accompanying drawings depicting a preferred embodiment in which FIGURE 1 is a cross sectional view of the valve in open position;

Figure 1:
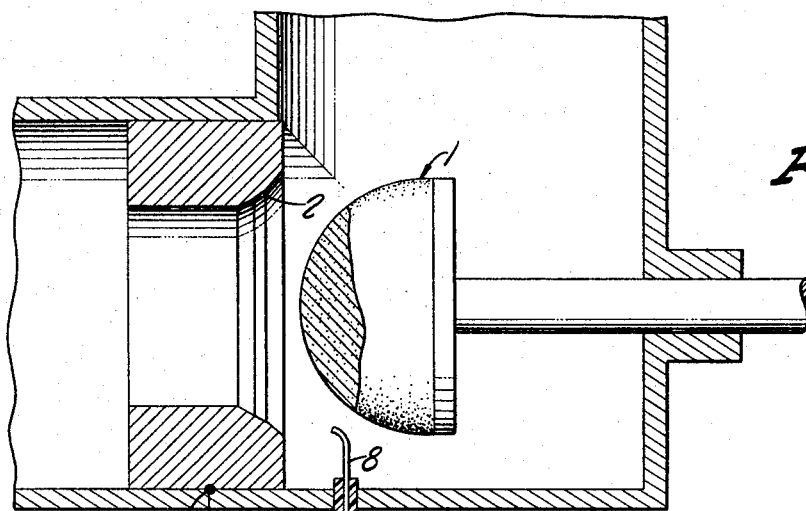

As can be seen in FIGURE 1, the ball valve 1 and the valve seat 2 can be of conventional configuration. The materials for both the ball valve and seat are electrically conductive, and the ball valve in this embodiment is a porous material which has been infiltrated with a lower melting metal. As shown in FIGURE 1, the valve seat is connected at point 3 to the electrical power supply circuit comprising resistor 4, capacitors 5 and 6, and battery 7. When the ball valve is in the closed position, as in FIGURE 2, the contact 8 touches the ball valve to complete the circuit through the valve members. The electrical power required to melt the infiltrated metal may then be supplied by closing the switch 9. When the switch is closed, heat is generated at the point of contact between the valve seat and the ball valve which forms the smooth contact shown in FIGURE 3. Optionally, switch 9 may be omitted in which case the circuit is opened and closed solely by the movement of ball 1 into and out of contact with seat 2.

In operation, it has been found that when the valve seat is composed of silicon nitride bonded silicon carbide and the valve of silver infiltrated tungsten, for example, the electrical energy required to melt the silver can be supplied by an electrical circuit wherein the capacitance totals about 450µf. the battery is a 300 volt dry cell. Obviously, these values will vary with the valve size, operating temperature, materials of construction and the like. Accordingly, the foregoing numerical values are presented solely to illustrate the invention.

As indicated above, the materials for both the mating valve and the seat must be electrically conductive. Likewise, at least one of the mating members is a porous material infiltrated by a metallic material melting below the melting point of any other material present at the mating surface. Thus, the infiltrated porous material can be tungsten or tungsten carbide that has been sintered and subsequently infiltrated with a lower melting metal such as copper, silver, lead, indium or alloys containing major portions of such metals as lead, tin, zinc, cadmium, indium, silver or copper. Preferably any soft metal having a melting point between that of indium (313° F.) and copper (1979° F.) can be used as the infiltrant, so long as the infiltrating metal is relatively nonreactive with the other materials used in the valve and the valve seat. In operation the tungsten or tungsten carbide provides the necessary support and structural integrity during the shock or compressive loading associated with the closing of the valve. The metal infiltrant provides a shock cushion and after the valve is closed can be melted locally by the electrical discharge, as indicated above. It has been found that when both mating members are composed of the infiltrated porous materials, some sticking occurs at the mating surfaces. This may be avoided by the application of heat to the surface.

In one embodiment, one of the mating members is composed of a non-porous material which is non-reactive with the metal infiltrant. For this purpose any material can be used so long as it is electrically conductive, although it is preferred that the material not be wetted by the molten metal. In this way there is no tendency for a bond to be established between the valve and the seat to impair subsequent valve opening. Typical of suitable non-porous materials is silicon nitride bonded silicon carbide.

Other porous materials suitable for use in the valve or valve seat include stainless steel, titanium, tantalum, molybdenum as well as various refractory compounds and alloys, such as titanium carbide, titanium nitride, molybdenum silicide and tantalum carbide.

Figure 2:
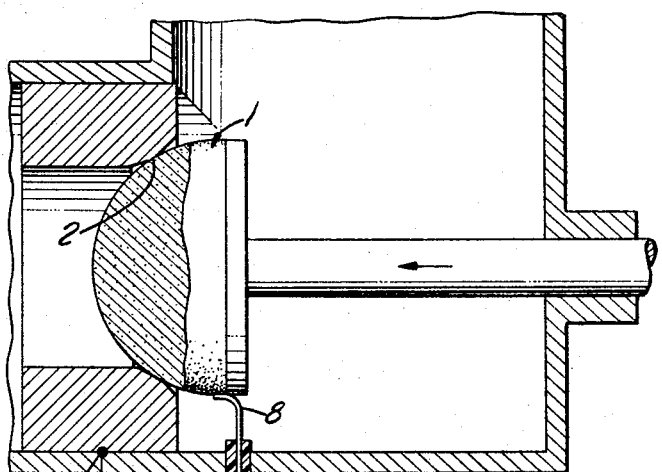
FIGURE 2 is a cross sectional view of the valve in closed position.
Figure 3:
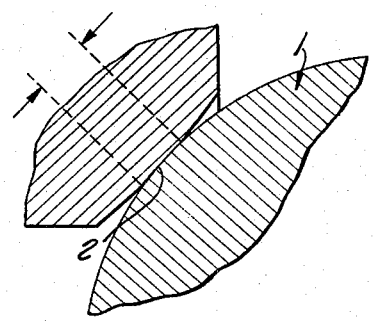
FIGURE 3 is an enlarged partial cross sectional view of the interface between the valve and the valve seat when the valve is in closed position.

Many variations in the electrical circuitry depicted in FIGURES 1 and 2 are possible. In practice, the actual power supply circuit for the electrical discharge will necessarily depend upon several valve design variables. To determine the energy necessary to effect melting at the junction, such factors as the relative mass of the valve and seat, the specific heat and thermo conductivities of the component materials and the resistance as determined by the contact angle or area of the junction must be considered. In general, those skilled in the art will be able to devise conventional discharge circuitry to adequately provide the necessary charge magnitude and duration for use in the valve arrangement of this invention.

Those skilled in the art will appreciate that the present invention is applicable to any valve having mated surfaces. Thus, the invention is not limited to the ball valve structure depicted in the drawings, but also has utility in the construction and operation of globe valves, needle valves and the like.

Having fully described the invention, it is intended that it be limited only by the lawful scope of the appended claims.

I claim:

1. A self-adjusting valve comprising a valve seat member, and receivable therein and in precise conformity therewith, a valve member, both members being electrically conductive, and at least one of said members being infiltrated by a metallic material having a melting point below that of either of said members.

2. A self-adjusting valve comprising a valve seat member and receivable therein and in precise conformity therewith, a valve member, both members being electrically conductive, and at least one of said members being composed of a porous material infiltrated by a metallic material having a melting point below that of the porous material.

3. A self-adjusting valve comprising a valve seat member and receivable therein and in precise conformity therewith, a valve member, both members being electrically conductive and being infiltrated by a metallic material having a melting point below, that of said members.

4. A self-adjusting valve comprising a valve seat member and receivable therein and in precise conformity therewith, a valve member, both members being electrically conductive said valve member being infiltrated by a metallic material having a melting point below that of either of said members, and said valve seat member being composed of a nonporous material which is not wetted by said metallic material.

5. A self-adjusting valve comprising a valve seat member, and receivable therein and in precise conformity therewith, a valve member, both members being electrically conductive, and said valve member being composed of a porous material infiltrated by a heat meltable substantially inert metallic material having a melting point between about 313° F. and about 1979° F.

6. A self-adjusting valve comprising a valve seat member, and receivable therein and in precise conformity therewith, a valve member, both members being electrically conductive, and said valve seat member being composed for a porous material infiltrated by a heat meltable substantially inert metallic material having a melting point between about 313° F. and about 1979° F.

7. A self-adjusting valve comprising a valve seat, and receivable therein and in precise conformity therewith, a valve, said valve seat and valve both being electrically conductive, and said valve being composed of a porous material infiltrated by a heat meltable substantially inert metallic material haing a melting point between about 313° F. and about 1979° F., and said valve seat being composed of a non-porous material which is not wetted by said metallic material.

8. A self-adjusting valve comprising a valve seat member, and receivable therein and in precise conformity therewith, a valve member, said valve seat and valve both being electrically conductive, said valve being composed of porous tungsten infiltrated by a metallic material having a melting point below that of either of said members.

9. A self-adjusting valve comprising a valve seat member, and receivable therein and in precise conformity therewith, a valve member, both members being electrically conductive and being composed of porous tungsten infiltrated by a metallic material having a melting point below that of either of said members.

10. A self-adjusting valve comprising a valve seat member, and receivable therein and in precise conformity therewith, a valve member, both members being electrically conductive, said valve being composed of porous tungsten infiltrated by a metallic material having melting point below that of either of said members, and said valve seat being composed of silicon nitride bonded silicon carbide.

11. A self-adjusting valve comprising a valve seat member, and receivable therein and in precise conformity therewith, a valve member, said valve seat and valve both being electrically conductive, said valve being composed of porous tungsten infiltrated by silver.

12. A self-adjusting valve comprising a valve seat member, and receivable therein and in precise conformity therewith, a valve member, said valve seat and valve both being electrically conductive, said valve being composed of porous tungsten infiltrated by silver and said valve seat being composed of silicon nitride bonded silicon carbide.

13. A self-adjusting valve comprising a valve seat member and receivable therein and in precise conformity therewith, a valve member, said valve seat and valve both being electrically conductive, and at least one of said members being composed of a porous material infiltrated by a metallic material having a melting point below that of either of said members, said valve seat and valve being in an electrical power supply circuit whereby heat is supplied to the mating surfaces to melt sufficient metallic material to provide smooth contact between the valve seat and the valve.

14. A self-adjusting valve comprising a valve seat member, and receivable therein and in precise conformity therewith, a valve member, said valve seat and vale both being electrically conductive, and said valve being composed of a porous material infiltrated by a metallic material having a melting point below that of either of said members, said valve seat and valve being in an electrical power supply circuit whereby heat is supplied to the mating surfaces to melt sufficient metallic material to provide smooth contact between the valve seat and the valve.

15. An electrical circuit comprising a self-adjusting valve comprising a valve seat member, and receivable therein and in precise conformity therewith, a valve member, said valve seat and valve both being electrically conductive, and at least one of said members being composed of a porous material infiltrated by a metallic material having a melting point below that of either of said members; and in electrical series with said valve members, an electric power source.

16. The circuit of claim 15 wherein the circuit is opened and closed by the relative movement between said valve member and said valve seat member whereby upon the mating of said members, current flows through the members from the power source to supply heat to the mating surfaces to melt said metallic material.

17. The circuit of claim 16 wherein there is additionally present in the circuit an electrical switch which may be opened and closed to regulate the flow of current from the power source to said valve members.

References Cited

UNITED STATES PATENTS

| | | | |
|---|---|---|---|
| 2,157,526 | 5/1939 | Chaney et al. | 251—368 X |
| 2,646,045 | 7/1953 | Tyson | 137—741 X |
| 2,771,900 | 11/1956 | Dayton | 137—251 |
| 2,942,615 | 6/1960 | Dayton | 137—248 |
| 2,952,605 | 9/1960 | Varda | 204—242 |
| 3,028,874 | 4/1962 | Burkett | 251—368 X |
| 3,110,319 | 11/1963 | Arata et al. | 137—341 X |
| 3,168,282 | 2/1965 | Latshaw et al. | 251—368 X |
| 3,254,189 | 5/1966 | Evanicsko et al. | 200—166 |
| 3,281,563 | 10/1966 | Waterton | 200—166 |

FOREIGN PATENTS

| | | |
|---|---|---|
| 40,094 | 4/1956 | Germany. |
| 849,253 | 9/1960 | Great Britain. |

M. CARY NELSON, *Primary Examiner.*

S. SCOTT, *Assistant Examiner.*